(12) United States Patent
Ito

(10) Patent No.: US 9,674,511 B2
(45) Date of Patent: Jun. 6, 2017

(54) STEREOSCOPIC IMAGE DISPLAY DEVICE

(75) Inventor: Hiroshi Ito, Ishikawa (JP)

(73) Assignee: EIZO Corporation, Ishikawa (JP)

(*) Notice: Subject to any disclaimer, the term of this patent is extended or adjusted under 35 U.S.C. 154(b) by 1055 days.

(21) Appl. No.: 13/825,507

(22) PCT Filed: Mar. 15, 2011

(86) PCT No.: PCT/JP2011/056069
§ 371 (c)(1),
(2), (4) Date: Mar. 21, 2013

(87) PCT Pub. No.: WO2012/042930
PCT Pub. Date: Apr. 5, 2012

(65) Prior Publication Data
US 2013/0182089 A1   Jul. 18, 2013

(30) Foreign Application Priority Data
Sep. 30, 2010  (JP) .................................. 2010-221451

(51) Int. Cl.
*H04N 13/04*  (2006.01)
*G02B 27/22*  (2006.01)

(52) U.S. Cl.
CPC ....... *H04N 13/0438* (2013.01); *G02B 27/225* (2013.01); *G02B 27/2264* (2013.01); *H04N 13/0418* (2013.01)

(58) Field of Classification Search
CPC ................................ H04N 13/00; H04N 13/02
(Continued)

(56) References Cited

U.S. PATENT DOCUMENTS

| 4,623,223 A * | 11/1986 | Kempf | ................. | G02B 27/225 348/51 |
| 6,172,807 B1 * | 1/2001 | Akamatsu | .......... | G02B 27/0093 348/51 |
| 2012/0026157 A1* | 2/2012 | Unkel | ................... | G09G 3/003 345/419 |

FOREIGN PATENT DOCUMENTS

| JP | 8-340556 A | 12/1996 |
| JP | 09-90276 A | 4/1997 |

(Continued)

OTHER PUBLICATIONS

Chinese Office Action dated Apr. 29, 2015, in connection with CN Application No. 201180044116.X.
(Continued)

*Primary Examiner* — Jorge L Ortiz Criado
*Assistant Examiner* — Kyle Lotfi
(74) *Attorney, Agent, or Firm* — Maier & Maier, PLLC

(57) ABSTRACT

The invention can provide a stereoscopic image display device, which achieves advantages of both a "glasses" device and a "naked-eye" device, while having a small size. When a right-eye image is displayed, a light blocking region forms on the left side of the center line, and when a left-eye image is displayed, a light blocking region forms on the right side of the center line. When the viewer is located in the regions, the right eye views the right-eye image, and the left eye views the left-eye image. Thus, even when the viewer faces stereoscopic display device with naked eyes, the viewer can view the stereoscopic image as long as the eyes of the viewer are located in the light blocking regions. The right and left images are mixed in the region other than the light blocking regions. However, multiple viewers can view the stereoscopic image when wearing the glasses.

5 Claims, 12 Drawing Sheets

(58) Field of Classification Search
USPC .................. 348/42–55; 345/419; 359/462
See application file for complete search history.

(56) References Cited

FOREIGN PATENT DOCUMENTS

| | | |
|---|---|---|
| JP | 2000-338449 A | 12/2000 |
| JP | 2004-112814 A | 4/2004 |
| JP | 2006-186768 A | 7/2006 |
| JP | 2010-20230 A | 1/2010 |
| WO | WO 2010/082262 A | 7/2010 |

OTHER PUBLICATIONS

International Search Report dated May 24, 2011, as issued in corresponding International Patent Application No. PCT/JP2011/056069, filed Mar. 15, 2011 (2 pages).

Extended European Search Report dated Feb. 2, 2017, including the Supplementary European Search Report and the European Search Opinion, in connection with corresponding EP Application No. 11828494.2 (9 pgs.).

* cited by examiner

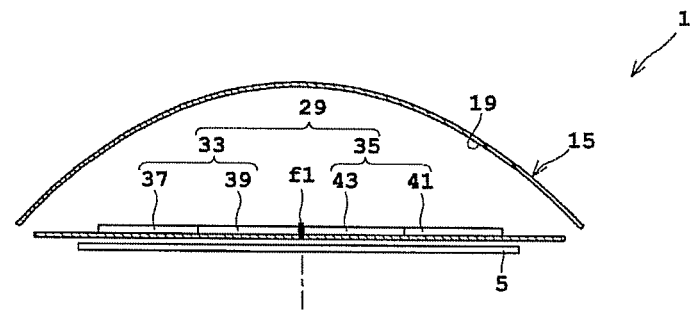
Fig. 8
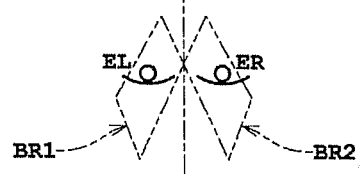

STEREOSCOPIC IMAGE DISPLAY DEVICE

RELATED APPLICATIONS

This application is the U.S. national stage application which claims priority under 35 U.S.C. §371 to International Patent Application No.: PCT/JP2011/056069, filed on Mar. 15, 2011, which claims priority under 35 U.S.C. §119, to Japanese Patent Application No.: 2010-221451, filed Sep. 30, 2010, the disclosures of which are incorporated by reference herein their entireties.

TECHNICAL FIELD

The present invention relates to a stereoscopic image display device that is capable of displaying images with binocular parallax in a time-division manner, and of making a viewer perceive the images as a stereoscopic image.

BACKGROUND ART

Conventionally, the example of this kind of device includes a so-called "glasses type" stereoscopic image display device. Specifically, for example, the stereoscopic image display device includes a semi-transparent mirror and an image display unit having a pair of a first image display part and a second image display part, which are arranged to form an L-shape. The first image display part directly faces the viewer, and the second image display part is located on a position perpendicular to a screen of the first image display part. The semi-transparent mirror is provided from the corner portion of the image display unit in an inclined manner (see, for example, Patent Document 1).

In this "glasses type" stereoscopic image display device, for example, the first image display part displays a left-eye image, and the second image display part displays a right-eye image. The first image display part emits light, a part of which is reflected by the semi-transparent mirror, and the rest of which passes through the semi-transparent mirror toward the viewer. Part of the light emitted from the second image display part passes through the semi-transparent mirror, and the rest of the light is reflected and travels toward the viewer. Since the light reflected by the semi-transparent mirror has a polarization state different from that of the passing-through light, the viewer is capable of viewing the different images with left and right eyes when the viewer wears glasses having different polarizing characteristics on left and right visions. As a result, the viewer is capable of viewing the stereoscopic image.

Also, the other example of the device includes a so-called "naked-eye type" stereoscopic image display device. Specifically, the stereoscopic image display device includes, for example, an image display unit and a semi-transparent mirror. The image display unit includes a pair of image display parts arranged to form an L-shape. One of the image display parts includes a first image display part, which has a screen facing the viewer, and a first view field selective glass, which limits a view angle. The other one of the image display parts includes a second image display part, which is positioned perpendicularly to the screen of the first image display part, and a second view field selective glass, which limits a view angle. The semi-transparent mirror is provided from the corner portion of the image display unit in an inclined manner (see, for example, Patent Document 2).

Since the "naked-eye type" device limits the view angle, the viewer is capable of viewing the stereoscopic image without wearing the glasses, which are required in the above "glasses type" device.

PRIOR ART REFERENCE

Patent Document

Patent Document 1: JP-A-2000-338449
Patent Document 2: JP-A-H09-90276

SUMMARY OF THE INVENTION

Problems to be Solved by the Invention

However, the conventional example having the above configuration has the following problems.

In other words, since the conventional stereoscopic image display devices have the image display parts arranged to form the L-shape both in the "glasses type" device and the "naked-eye type" device, the size of the device are disadvantageously large. Also, disadvantageously, it is impossible to achieve the advantages of both the "glasses type" device and the "naked-eye type" device.

The present invention is made in view of the above problems, and it is an objective of the present invention to provide a stereoscopic image display device, which achieves advantages of both a "glasses type" device and a "naked-eye type" device, while enabling a small size of the device.

Means for Solving the Problems

The present invention has the following configuration in order to achieve the above objectives.

In other words, in the invention according to claim 1, a stereoscopic image display device for displaying a stereoscopic image includes:

a transparent display panel provided to alternately display a right-eye image and a left-eye image in a time-division manner;

a light-gathering means provided on a back side of the transparent display panel, the light-gathering means having a first focal point on the back side of the transparent display panel, the light-gathering means having a second focal point in such a way that a straight line connecting the first focal point and the second focal point is located between both eyes of a viewer; and a light source unit provided to face the light-gathering means, the light source unit having a first light source and a second light source, which are located to interpose the first focal point therebetween in a planar view, the first light source and the second light source alternately and asymmetrically emitting light in a time-division manner, where a part of the first light source and the second light source adjacent the first focal point is turned off based on which of the right-eye image and the left-eye image is displayed, wherein:

a mixed region, a first region, and a second region are formed on the viewer side;

the right-eye image and the left-eye image of the transparent display panel both reach the mixed region;

the right-eye image of the transparent display panel reaches the first region exclusively; and the left-eye image of the transparent display panel reaches the second region exclusively.

[Operation/Effect]

According to the invention according to claim 1, the light emitted by the light source unit passes through the transparent display panel from the first focal point via the light-gathering means, and is gathered at the second focal point at a viewer side. Since the first light source and the second light source of the light source unit alternately and asymmetrically emit light in a time-division manner, where the light adjacent the first focal point is turned off based on which of the right-eye image and left-eye image is displayed, there are formed a mixed region, a first region, and a second region in the viewer side. The right-eye image and the left-eye image both reach the mixed region, the right-eye image reaches the first region exclusively, and the left-eye image reaches the second region exclusively. When the viewer faces the stereoscopic image display device so that the right eye is located in the first region and the left eye is located in the second region, the right eye of the viewer exclusively views the right-eye image, and the left eye of the viewer exclusively views the left-eye image. Thereby, the viewer is capable of viewing the stereoscopic image with naked eyes. Also, multiple viewers are capable of viewing the stereoscopic image in the mixed region at the same time if the viewers wear the viewing glasses that work with the change of the images. As a result, the stereoscopic image display device can achieve the advantages of the naked-eye type device and the glasses type device without executing any switching operation. Also, since the single transparent display panel selectively displays the left-eye image and the right-eye image, it is possible to reduce the size of the device compared with the device that has two display panels combined into the L-shape.

Also, in the invention according to claim 2, a stereoscopic image display device for displaying a stereoscopic image includes:

a transparent display panel provided to alternately display a right-eye image and a left-eye image in a time-division manner;

a reflection unit provided on a back side of the transparent display panel, the reflection unit having an elliptical mirror that includes:

a reflection surface, which forms a part of an arc of an ellipse, and which has a shape symmetrical about a center line in a planar view;

a first focal point of the ellipse located on the back side of the transparent display panel and also on the reflection surface side; and a second focal point of the ellipse located on a viewer side;

a light source unit that includes a first light source and a second light source, which are located on the first focal point side of the reflection unit, wherein:

the first light source and the second light source are located on the back side of the transparent display panel so as to be positioned to emit light toward the reflection surface;

the first light source and the second light source are provided between a part of the arc of the ellipse and the display panel so as to interpose the first focal point of the reflection unit between the light sources in the planar view; and each of the first light source and the second light source has, when viewed from the viewer, an outer part located away from the first focal point and an inner part located adjacent the first focal point, the outer part and the inner part being independently controllable to emit light;

a light source control part that controls the light source unit to cause an entire surface of the first light source and only the outer part of the second light source to emit light when the right-eye image is displayed on the transparent display panel, the light source control part controlling the light source unit to cause an entire surface of the second light source and only the outer part of the first light source to emit light when the left-eye image is displayed on the transparent display panel; and viewing glasses that allow light to enter a right eye and block light from entering a left eye when the right-eye image is displayed on the transparent display panel, wherein the viewing glasses allow light to enter the left eye and block light from entering the right eye when the left-eye image is displayed on the transparent display panel.

[Operation/Effect]

According to the invention according to claim 2, the light emitted by the light source unit is reflected by the elliptical mirror of the reflection unit, and passes through the transparent display panel to travel toward the viewer. The light source control part controls the first light source and the second light source of the light source unit to cause an entire surface of first light source and only the outer part of the second light source to emit light when the right-eye image is displayed. Also, the light source control part controls the light sources to cause an entire surface of the second light source and only the outer part of the first light source to emit light when the left-eye image is displayed. In other words, since the light-emitting parts of the light source unit change asymmetrically based on which of the right-eye image and the left-eye image is displayed, there are alternately formed, in a time-division manner, a region on the left eye side of the viewer, where the right-eye image is invisible, and another region on the right eye side of the viewer, where the left-eye image is invisible. When the viewer is located on the position, the viewer is incapable of viewing the right-eye image with his/her left eye but is capable of viewing only the right-eye image with his/her right eye. Also, the viewer is incapable of viewing the left-eye image with his/her right eye but is capable of viewing only the left-eye image with his/her left eye. As a result, the viewer is capable of viewing the stereoscopic image with his/her naked eyes. Also, the both images are mixed in the region other than the region formed on the left eye side of the viewer where the right-eye image is invisible, and in the region other than the region formed on the right eye side of the viewer where the left-eye image is invisible. However, multiple viewers are capable of viewing the stereoscopic image simultaneously if the viewers wear viewing glasses that work with the change of the images to allow light only to pass therethrough to the corresponding eye. As a result, the stereoscopic image display device can achieve the advantages of the naked-eye type device and the glasses type device without executing any switching operation. Also, since the single transparent display panel selectively displays the left-eye image and the right-eye image, it is possible to reduce the size of the device compared with the device that has two display panels combined into the L-shape.

Note that the example of the viewing glasses includes liquid crystal shutter glasses that block the left and right visions depending on the display images.

Also, in the invention according to claim 3, a stereoscopic image display device for displaying a stereoscopic image includes:

a transparent display panel provided to alternately display a right-eye image and a left-eye image in a time-division manner;

a cylindrical convex lens provided on a back side of the transparent display panel, wherein the cylindrical convex lens has a first focal point on the back side of the transparent display panel and a second focal point on a viewer side;

a light source unit that includes a first light source and a second light source, which are located on a back side of the cylindrical convex lens so as to be positioned to emit light toward the cylindrical convex lens, wherein:

the first light source and the second light source are provided to interpose the first focal point of the cylindrical convex lens between the light sources in a planar view; and each of the first light source and the second light source has, when viewed from the viewer, an outer part located away from the first focal point and an inner part located adjacent the first focal point, the outer part and the inner part being independently controllable to emit light;

a light source control part that controls the light source unit to cause an entire surface of the first light source and only the outer part of the second light source to emit light when the right-eye image is displayed on the transparent display panel, the light source control part controlling the light source unit to cause an entire surface of the second light source and only the outer part of the first light source to emit light when the left-eye image is displayed on the transparent display panel; and viewing glasses that allow light to enter a right eye and block light from entering a left eye when the right-eye image is displayed on the transparent display panel, wherein the viewing glasses allow light to enter the left eye and block light from entering the right eye when the left-eye image is displayed on the transparent display panel.

[Operation/Effect]

According to the invention according to claim 3, the light emitted by the light source unit is bent by the cylindrical convex lens and passes through the transparent display panel to travel toward the viewer. The light source control part controls the first light source and the second light source of the light source unit to cause an entire surface of first light source and only the outer part of the second light source to emit light when the right-eye image is displayed. Also, the light source control part controls the light sources to cause an entire surface of the second light source and only the outer part of the first light source to emit light when the left-eye image is displayed. In other words, since the light-emitting parts of the light source unit change asymmetrically based on which of the right-eye image and the left-eye image is displayed, there are alternately formed, in a time-division manner, a region in the left eye of the viewer, where the right-eye image is invisible, and another region, where the left-eye image is invisible to the right eye of the viewer. When the viewer is located on the position, the viewer is incapable of viewing the right-eye image with his/her left eye but is capable of viewing only the right-eye image with his/her right eye. Also, the viewer is incapable of viewing the left-eye image with his/her right eye but is capable of viewing only the left-eye image with his/her left eye. As a result, the viewer is capable of viewing the stereoscopic image with his/her naked eyes. Also, the both images are mixed in the region other than the region formed on the left eye side of the viewer where the right-eye image is invisible, and in the region other than the region formed on the right eye side of the viewer where the left-eye image is invisible. However, multiple viewers are capable of viewing the stereoscopic image simultaneously if the viewers wear viewing glasses that work with the change of the images to allow light only to pass therethrough to the corresponding eye. As a result, the stereoscopic image display device can achieve the advantages of the naked-eye type device and the glasses type device without executing any switching operation. Also, since the single transparent display panel selectively displays the left-eye image and the right-eye image, it is possible to reduce the size of the device compared with the device that has two display panels combined into the L-shape.

Note that the example of the viewing glasses includes liquid crystal shutter glasses that block vision of the right and the left in accordance with the display images.

Also, the present invention further includes a polarization state changing panel provided to the transparent display panel for making a polarization state of the right-eye image different from a polarization state of the left-eye image, wherein: a right-eye lens of the viewing glasses is in a polarization state that allows the right-eye image to pass therethrough and blocks the left-eye image, and a left-eye lens of the viewing glasses is in a polarization state that allows the left-eye image to pass therethrough and blocks the right-eye image (Claim 4). Since the polarization state changing panel causes the right-eye image and the left-eye image to have different polarization states, multiple viewers are capable of viewing the stereoscopic image simultaneously if the viewers wear viewing glasses, which have a right-eye lens with a polarization state that allows only the right-eye image to pass through the lens, and which have a left-eye lens with another polarization state that allows only the left-eye image to pass through the lens. Also, the viewing glasses are capable of reducing burden on the eye of the viewer compared with the shutter-type viewing glasses that alternately block vision in a time-division manner.

Also, in the present invention, preferably, each of the first light source and the second light source of the light source unit includes, in a separate manner, an outer light source, which is located on an outer side thereof away from the first focal point, and an inner light source, which is located on an inner side thereof adjacent the first focal point (Claim 5). Since it is only needed to control the turning on and off of the outer light source and the inner light source, it is possible to simplify the control by the light source control part.

Also, in the present invention, preferably, each of the first light source and the second light source of the light source unit has a plurality of small-size light sources, and is an integrated light source comprised of an outer part located away from the first focal point and an inner part located adjacent the first focal point, the outer part and the inner part being independently controllable (Claim 6). Since it is possible to cause the inner part and the outer part to emit light at any position, it is possible to adjust, to some extent, the size and position of the first region and the second region. As a result, it is possible to delicately adjust the position for viewing the stereoscopic image with naked eyes.

Advantages of the Invention

According to the stereoscopic image display device of the present invention, the light emitted by the light source unit passes through the transparent display panel via the light-gathering means and converges to the second focal point adjacent the viewer. The first light source and the second light source of the light source unit alternately and asymmetrically emit light in a time-division manner, where a part of the first light source and the second light source adjacent the first focal point is turned off based on which of the right-eye image and the left-eye image is displayed. As a result, there are formed a mixed region, a first region, and a second region in the area adjacent the viewer. The right-eye image and the left-eye image both reach the mixed region, the right-eye image reaches the first region exclusively, and the left-eye image reaches the second region exclusively. When the viewer faces the stereoscopic image display device so that the eyes are located in the first region and the second region, the right eye exclusively views the right-eye image, and the left eye exclusively views the left-eye image. Thereby, the viewer is capable of viewing the stereoscopic image with naked eyes. Also, multiple viewers are capable of viewing the stereoscopic image in the mixed region at the same time if the viewers wear the viewing glasses that work with the change of the images. As a result, the stereoscopic image display device can achieve the advantages of the naked-eye type device and the glasses type device without executing any switching operation. Also, since the single transparent display panel selectively displays the left-eye image and the right-eye image, it is possible to reduce the size of the device compared with the device that has two display panels combined into the L-shape.

BRIEF DESCRIPTION OF THE DRAWINGS

FIG. 8 is a diagram for explaining a state for viewing a stereoscopic image.

EMBODIMENT FOR CARRYING OUT THE INVENTION

An embodiment of a stereoscopic image display device according to the present invention will be described below.

First Embodiment

Hereinafter, by referring to drawings, the first embodiment of the present invention will be described.

Figure 1:
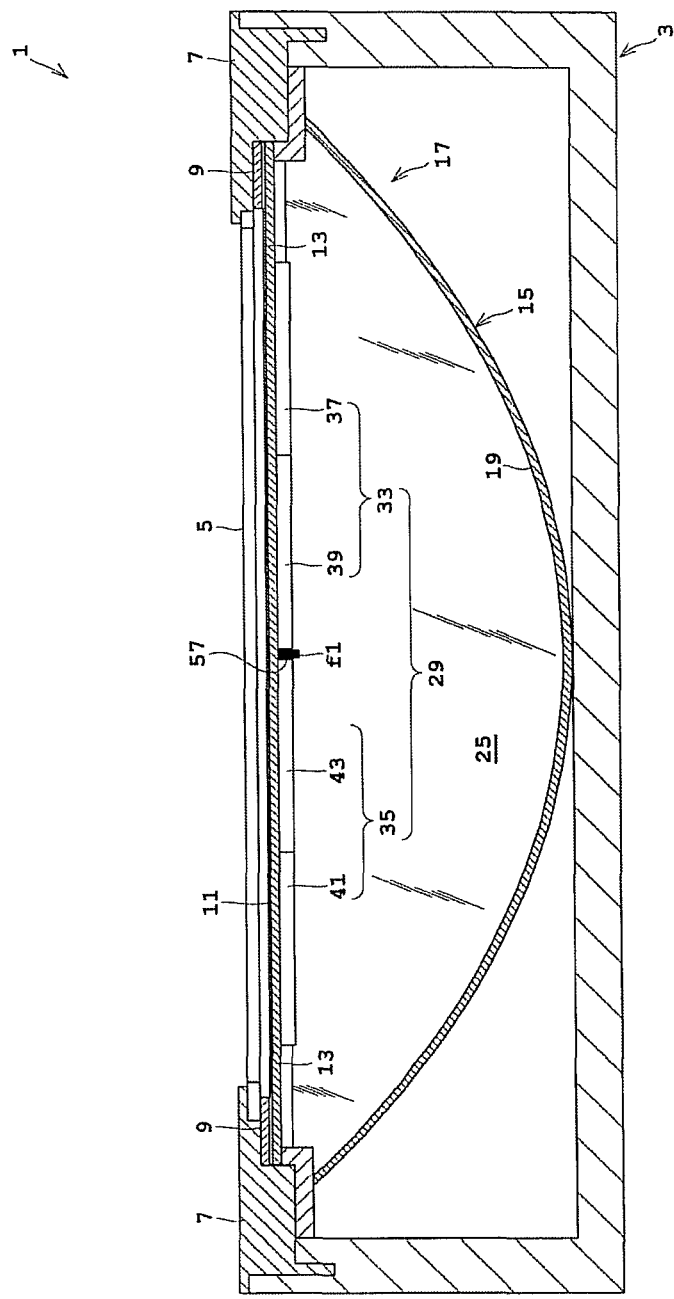
FIG. 1 is a transverse sectional view illustrating a schematic configuration of a stereoscopic image display device according to the first embodiment.
Figure 2:
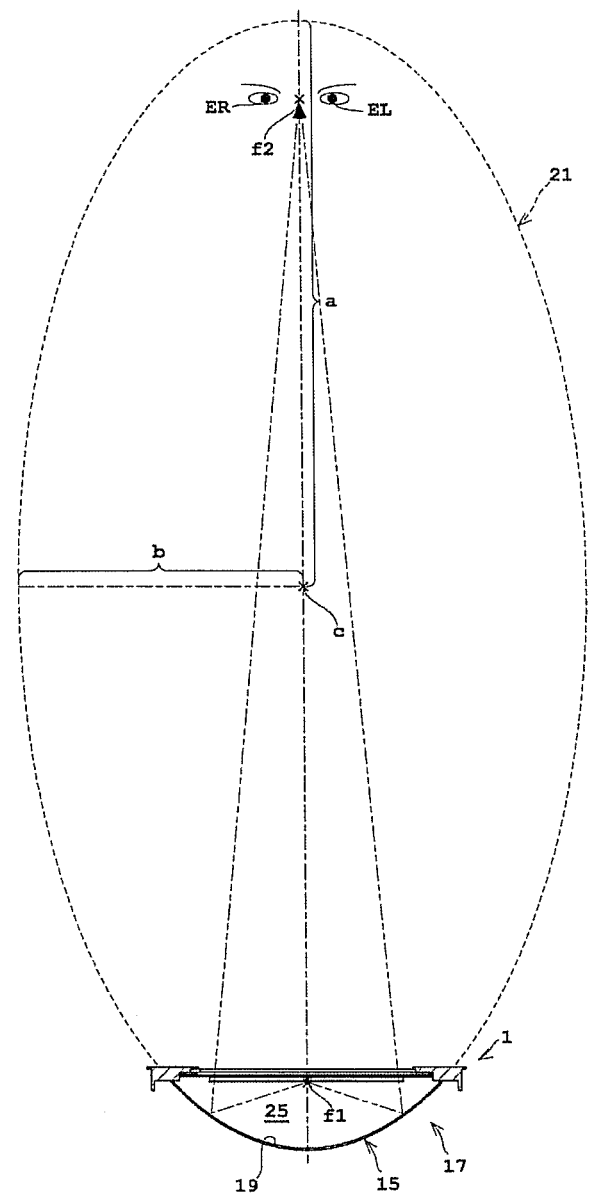
FIG. 2 is a schematic diagram for explaining an ellipse that constitutes an elliptical mirror.
Figure 3:
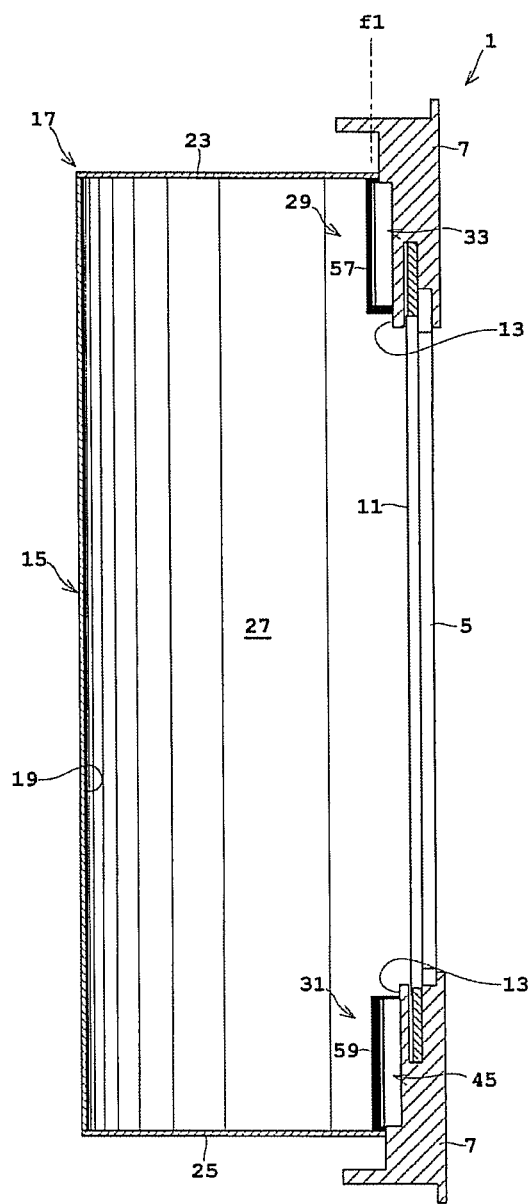
FIG. 3 is a longitudinal sectional view illustrating a schematic configuration of the stereoscopic image display device according to the first embodiment.
Figure 4:
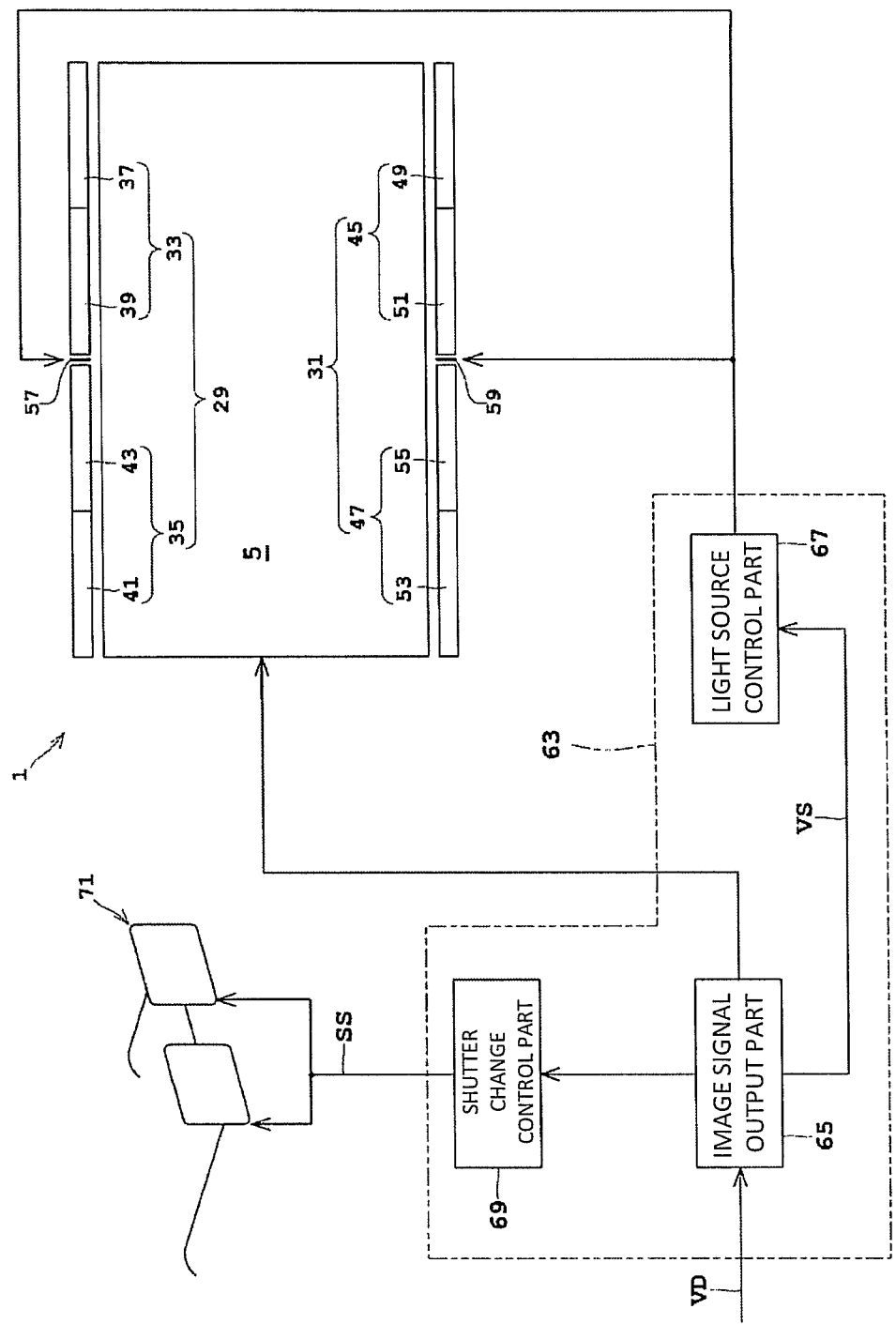
FIG. 4 is a block diagram of a control system.

FIG. 1 is a transverse sectional view illustrating a schematic configuration of stereoscopic image display device according to the embodiment, FIG. 2 is a schematic diagram for explaining an ellipse that constitutes an elliptical mirror, FIG. 3 is a longitudinal sectional view illustrating a schematic configuration of the stereoscopic image display device according to the embodiment, and FIG. 4 is a block diagram of a control system. Note that the diagram of the stereoscopic image display device in FIG. 4 is viewed from the elliptical mirror. Also, in FIG. 2 and FIG. 3, for the convenience of explanation, a casing is not shown.

A stereoscopic image display device 1 of the present first embodiment includes a casing 3 having a transverse section of a U shape. The casing 3 has a front surface (an upper surface in FIG. 1), which is provided with a transparent display panel 5 through a supporting frame 7. The supporting frame 7 includes a front bezel. The transparent liquid crystal display panel 5 has a scattering member 11, which is provided through a spacer 9, on a back side (a lower surface in FIG. 1) thereof. The scattering member 11 has a function to scatter light in a longitudinal direction (a direction of the paper in FIG. 1). The supporting frame 7, which is located on a back side of the spacer 9, has attaching frames 13 at upper and lower sides thereof.

Since the above scattering member 11 is provided, it is possible to suppress the reflection, on the transparent liquid crystal display panel 5, of the borders extending in the transverse direction near connection points between an elliptical mirror 15 and an upper reflection plate 23 or between the elliptical mirror 15 and a lower reflection plate 25.

A reflection unit 17, which has the elliptical mirror 15, is provided on a back (lower side in FIG. 1) of the attaching frames 13. The elliptical mirror 15 has a concave surface that serves as a reflection surface 19. FIG. 2 will be referred to for the elliptical mirror 15.

The elliptical mirror 15 is formed in accordance with a part of the arc of an ellipse 21. The ellipse 21 has a center c, a long axis a, and a short axis b. Since the long axis a coincides with a center line, the elliptical mirror 15 has a shape symmetrical about the center line. The ellipse 21 has a first focal point f1 on the reflection surface 19 side. In other words, the first focal point f1 is located near a chord of the part of the ellipse 21, which constitutes the elliptical mirror 15. The ellipse 21 has a second focal point f2 that is located between a right eye ER and a left eye EL of the viewer (or located near the glabella of the viewer). In other words, a straight line, which connects the first focal point f1 and the second focal point f2, is set between the right eye ER and the left eye EL of the viewer. Note that the second focal point f2 may be located on any position on the straight line. Also, it is needless to mention that the first focal point f1 and the second focal point f2 do not indicate only respective points, but that the first focal point f1 and the second focal point f2 have a certain optical spread.

The reflection unit 17 has the upper reflection plate 23 on an upper edge side of the elliptical mirror 15, and has the lower reflection plate 25 on a lower edge side of the elliptical mirror 15 (FIG. 3). The upper reflection plate 23 and the lower reflection plate 25 both have plate shapes that cover a range from the reflection surface 19 of the elliptical mirror 15 to a position that corresponds to the chord for the part of the arc of the ellipse 21, which constitutes the elliptical mirror 15. Note that in FIG. 1 and FIG. 2, the upper reflection plate 23 is omitted for better illustration. The upper reflection plate 23 and the lower reflection plate 25 surround a light path space 27, which is not filled with any optical material or the like but is filled with air. Note that the light path space 27 may be filled with an optical material. In this case, it is possible to suppress the deterioration of the reflection surface 19.

The attaching frames 13 are located on the first focal point f1 side of the reflection unit 17, the upper attaching frame 13 is provided with an upper light source unit 29, and the lower attaching frame 13 is provided with a lower light source unit 31 (FIG. 3). The upper light source unit 29 has a right-eye light source 33 and a left-eye light source 35, which are located to interpose the first focal point f1 therebetween in a planar view (FIG. 1). The right-eye light source 33 has two light sources, a right-eye outer light source 37 and a right-eye inner light source 39. The right-eye outer light source 37 is located on an outer side of the right-eye light source 33, which side is away from the first focal point f1. The right-eye inner light source 39 is located on an inner side of the right-eye light source 33, which is located close to the first focal point f1. In the present first embodiment, the right-eye outer light source 37 and the right-eye inner light source 39 are separate light sources each having the length, for example, almost equivalent to a half of the length of the right-eye light source 33. Also, the left-eye light source 35 has a left-eye outer light source 41 and a left-eye inner light source 43 similarly.

The lower light source unit 31 has a right-eye light source 45 and a left-eye light source 47, which are located to interpose the first focal point f1 therebetween in a planar view. The right-eye light source 45 has a right-eye outer light source 49 and a right-eye inner light source 51, similarly to the above upper light source unit 29. The left-eye light source 47 has a left-eye outer light source 53 and a left-eye inner light source 55.

Also, all light sources, that is, the right-eye light source 33, the left-eye light source 35, the right-eye light source 45, and the left-eye light source 47, are attached to the attaching frames 13 so that all light sources are positioned to emit light to the reflection surface 19. Specifically, each of light sources 33, 35, 45, 47 has a light emitting surface facing the reflection surface 19.

The upper light source unit 29 has an upper light shielding member 57 between the right-eye light source 33 and the left-eye light source 35. Similarly, the lower light source unit 31 has a lower light shielding member 59 between the right-eye light source 45 and the left-eye light source 47. The upper light shielding member 57 and the lower light shielding member 59 are made of an element that prevents light from passing therethrough.

Note that the above transparent liquid crystal display panel 5 corresponds to a "transparent display panel" of the present invention, the elliptical mirror 15 corresponds to a "light-gathering means". Also, the above upper light source unit 29 and the lower light source unit 31 correspond to a "light source unit" of the present invention. Also, the right-eye light sources 33, 45 correspond to a "first light source" of the present invention, and the left-eye light sources 35, 47 correspond to a "second light source" of the present invention. Also, the right-eye outer light sources 37, 49 and the left-eye outer light sources 41, 53 correspond to an "outer light source" of the present invention, and the right-eye inner light sources 39, 51 and the left-eye inner light sources 43, 55 correspond to an "inner light source" of the present invention.

<Control System>

Figure 5:
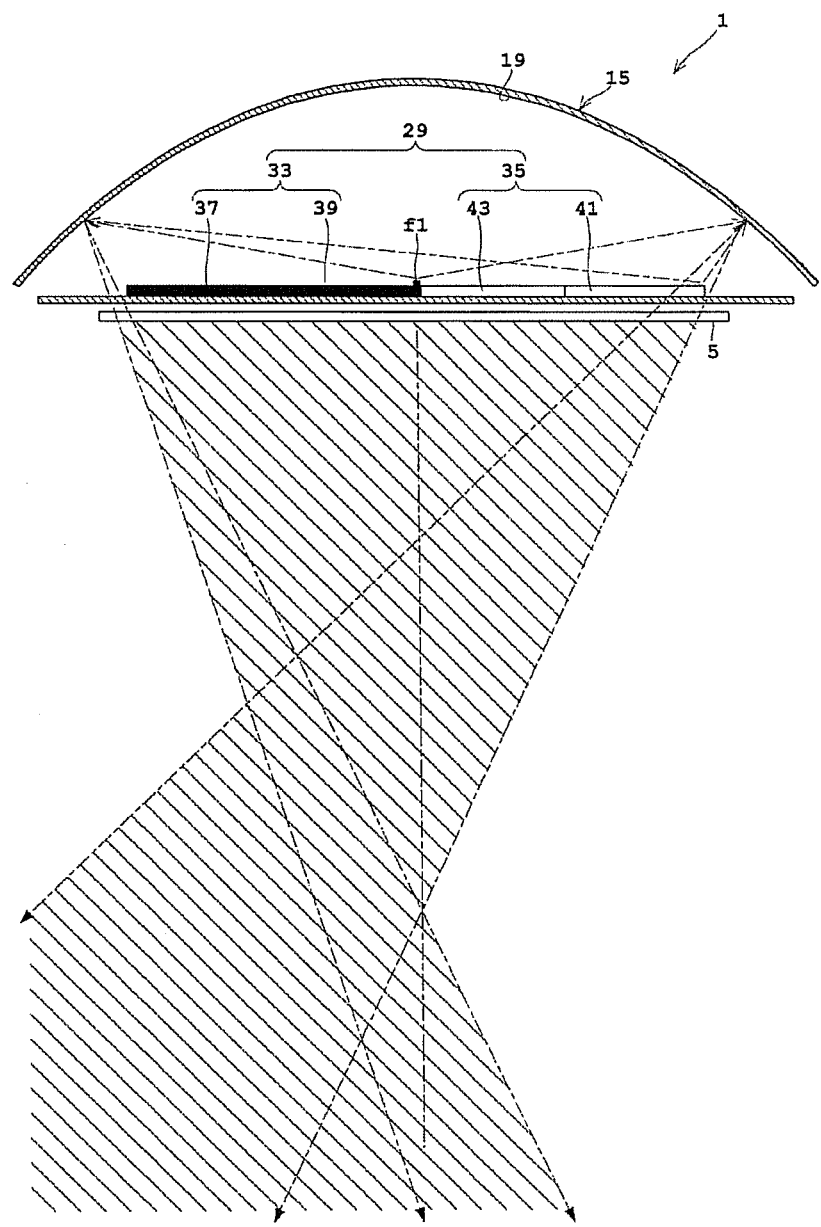
FIG. 5 is a schematic diagram illustrating a light path formed by a left-eye light source.
Figure 6:
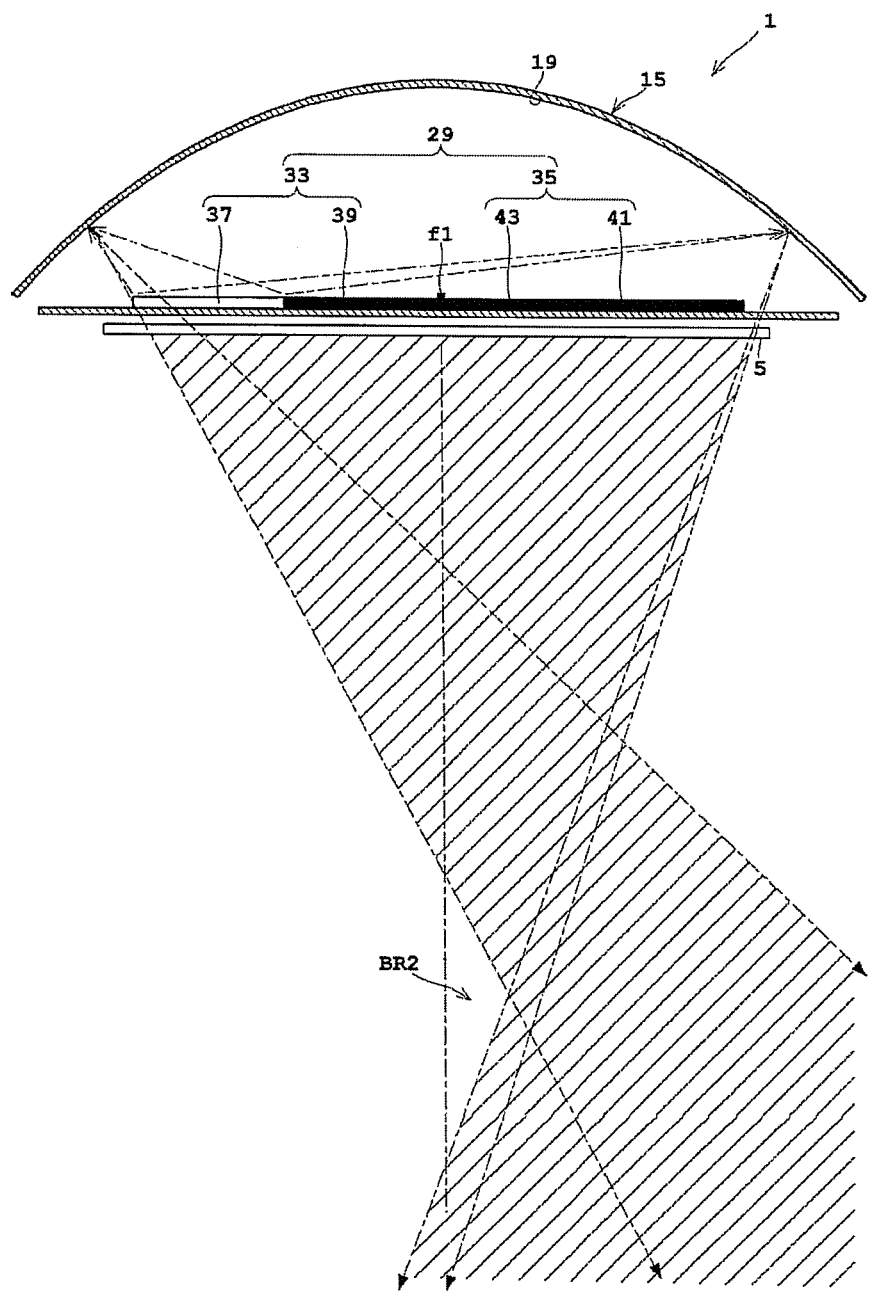
FIG. 6 is a schematic diagram illustrating a light path formed by a right-eye outer light source.
Figure 7:
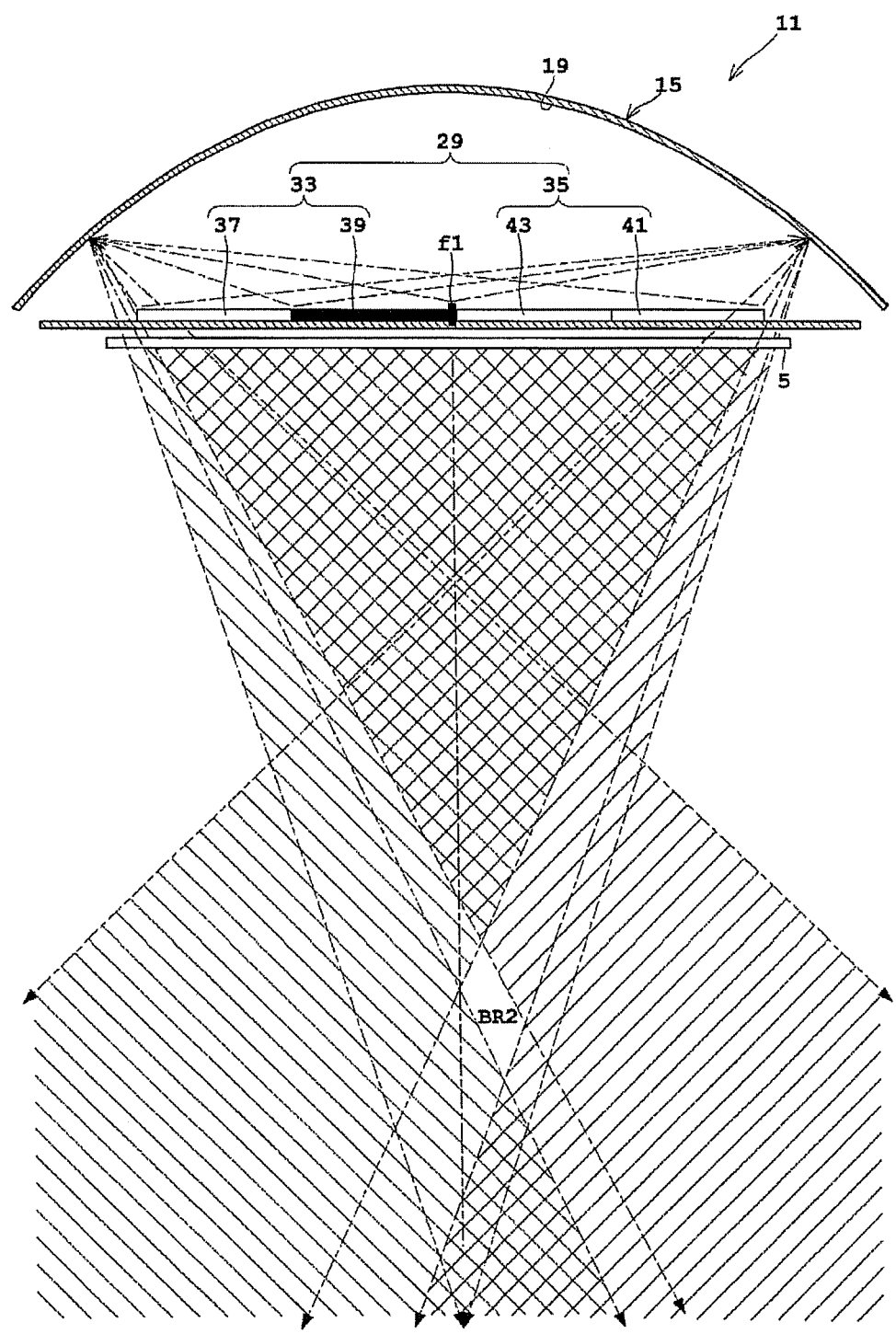
FIG. 7 is a schematic diagram illustrating a light path of formed by light source units when a left-eye image is displayed.

Next, FIG. 4 to FIG. 8 are referred to. FIG. 4 is a block diagram of a control system. FIG. 5 is a schematic diagram illustrating a light path of the left-eye light source, FIG. 6 is a schematic diagram illustrating a light path of the right-eye outer light source, FIG. 7 is a schematic diagram illustrating a light path of the light source unit while the left-eye image is displayed, and FIG. 8 is a diagram for explaining the state for viewing the stereoscopic image.

A control part 63 has an image signal output part 65, a light source control part 67, and a shutter change control part 69. The image signal output part 65 receives video signals VD, and alternately outputs, in a time-division manner, a right-eye image and a left-eye image, which use the binocular parallax, toward the transparent liquid crystal display panel 5. The light source control part 67 controls lighting of the upper light source unit 29 and the lower light source unit 31 according to vertical synchronization signals VS when the image signal output part 65 sequentially changes the right-eye image and the left-eye image. The shutter change control part 69 outputs shutter control signals SS, which are used for controlling the shutter so that the shutter alternately blocks, in a time-division manner, vision of the right eye and the left eye of a pair of viewing glasses 71, according to the timing of changing the right-eye image and the left-eye image by the image signal output part 65. The viewing glasses 71 have, for example, a liquid crystal shutter, and are capable of allowing and prohibiting the vision of the right eye and the left eye. The shutter control signals SS have information for allowing the vision of the right-eye lens of the viewing glasses 71 and for blocking the vision of the left-eye lens when the right-eye image is displayed. Also, the shutter control signals SS have information for allowing the vision of the left-eye lens of the viewing glasses 71 and for blocking the vision of the right-eye lens when the left-eye image is displayed. In other words, the shutter control signal SS corresponds to information for controlling the viewing glasses 71 to allow light to reach the right eye and to prohibit light from reaching the left eye when the right-eye image is displayed, and for controlling the viewing glasses 71 to allow light to reach the left eye and to prohibit light from reaching the right eye when the left-eye image is displayed.

The light source control part 67 controls the lighting of the right-eye light sources 33, 45 and the left-eye light sources 35, 47 of the upper light source unit 29 and the lower light source unit 31 when the image signal output part 65 outputs the right-eye image and the left-eye image to the transparent liquid crystal display panel 5. Furthermore, the light source control part 67 independently controls the right-eye outer light sources 37, 49 and the right-eye inner light sources 39, 51, and also independently controls the left-eye outer light sources 41, 53 and the left-eye inner light sources 43, 55.

From now on, there is described a concrete example of the lighting control by the light source control part 67 when the left-eye image is displayed. Note that since the upper light source unit 29 and the lower light source unit 31 operate in the similar manner, the upper light source unit 29 will be described as the example.

FIG. 5 shows a light path when the left-eye light source 35 is exclusively turned on. Light emitted by the left-eye outer light source 41 and the left-eye inner light source 43 of the left-eye light source 35 is reflected on the reflection surface 19 and passes through the transparent liquid crystal display panel 5 to travel toward the viewer (not shown). Note that since the left-eye light source 35 is provided on the right side in FIG. 5, light from the left-eye light source 35 is biased toward the left from the center line.

FIG. 6 shows a light path when the right-eye outer light source 37 is exclusively turned on. Light emitted by the right-eye outer light source 37 is reflected on the reflection surface 19 and passes through the transparent liquid crystal display panel 5 to travel toward the viewer (not shown). Note that since the right-eye light source 33 is provided on the left side in FIG. 6, the light from the right-eye light source 33 is biased toward the right from the center line. Furthermore, the right-eye outer light source 37 is exclusively turned on among the right-eye light source 33. In other words, light is emitted from the outer part of the right-eye light source 33, which is on the left side in FIG. 6, or which is located away from the first focal point f1, a light blocking region BR2 (second region), which light does not reach, is generated in the area on the viewer side of the display panel 5 and on the right side of the center line (toward the right eye ER of the viewer).

As a result, when the left-eye image is displayed, the light source control part 67 turns on the left-eye light source 35 and the right-eye outer light source 37, then the light sources 35, 37 emit light asymmetrically about the center line. As a result, the generated light path shows a pattern obtained by overlaying the light path in FIG. 5 on the light path in FIG. 6. In other words, the left-eye image travels toward the viewer in a manner shown in FIG. 7. As a result, when the viewer faces the stereoscopic image display device 1 so that the right eye ER of the viewer is located within the light blocking region BR2, the left eye EL of the viewer perceives the left-eye image displayed on the transparent liquid crystal display panel 5, and the right eye ER does not perceive the left-eye image.

When the right-eye image is displayed on the transparent liquid crystal display panel 5, the light source control part 67 executes the lighting control in a manner opposite from the above. In other words, when the right-eye light source 33 and the left-eye outer light source 41 are turned on in order to emit light asymmetrically about the center line, the light path is formed to have the pattern obtained by reversing the drawing of FIG. 7 left to right relative to the center line. Thereby, a light blocking region BR1 (first region) is formed on a left side of the center line. As a result, as shown in FIG. 8, when the right-eye image is displayed, the light blocking region BR1 is formed on the left side of the center line, and when the left-eye image is displayed, the light blocking region BR2 is formed on the right side of the center line. When the viewer is located in the region, the right eye ER of the viewer exclusively views the right-eye image, and the left eye EL of the viewer exclusively views the left-eye image. As a result, even when the viewer faces stereoscopic display device 1 with naked eyes, the viewer is capable of viewing the stereoscopic image as long as the eyes of the viewer are located in the light blocking regions BR1, BR2.

In contrast, the right-eye image and the left-eye image are mixed in the region (mixed region) other than the light blocking regions BR1, BR2. However, the multiple viewers are capable of simultaneously viewing the stereoscopic image if the viewers wear the viewing glasses 71.

As a result, the stereoscopic image display device 1 can achieve the advantages of the naked-eye type device and the glasses type device without executing any switching operation between the naked-eye type and the glasses type. Also, since the single transparent liquid crystal display panel 5 selectively displays the left-eye image and the right-eye image, it is possible to make the device smaller in size compared with the device that has two display panels combined into the L-shape.

Second Embodiment

Next, the second embodiment of the present invention will be described with reference to drawings.

Figure 9:
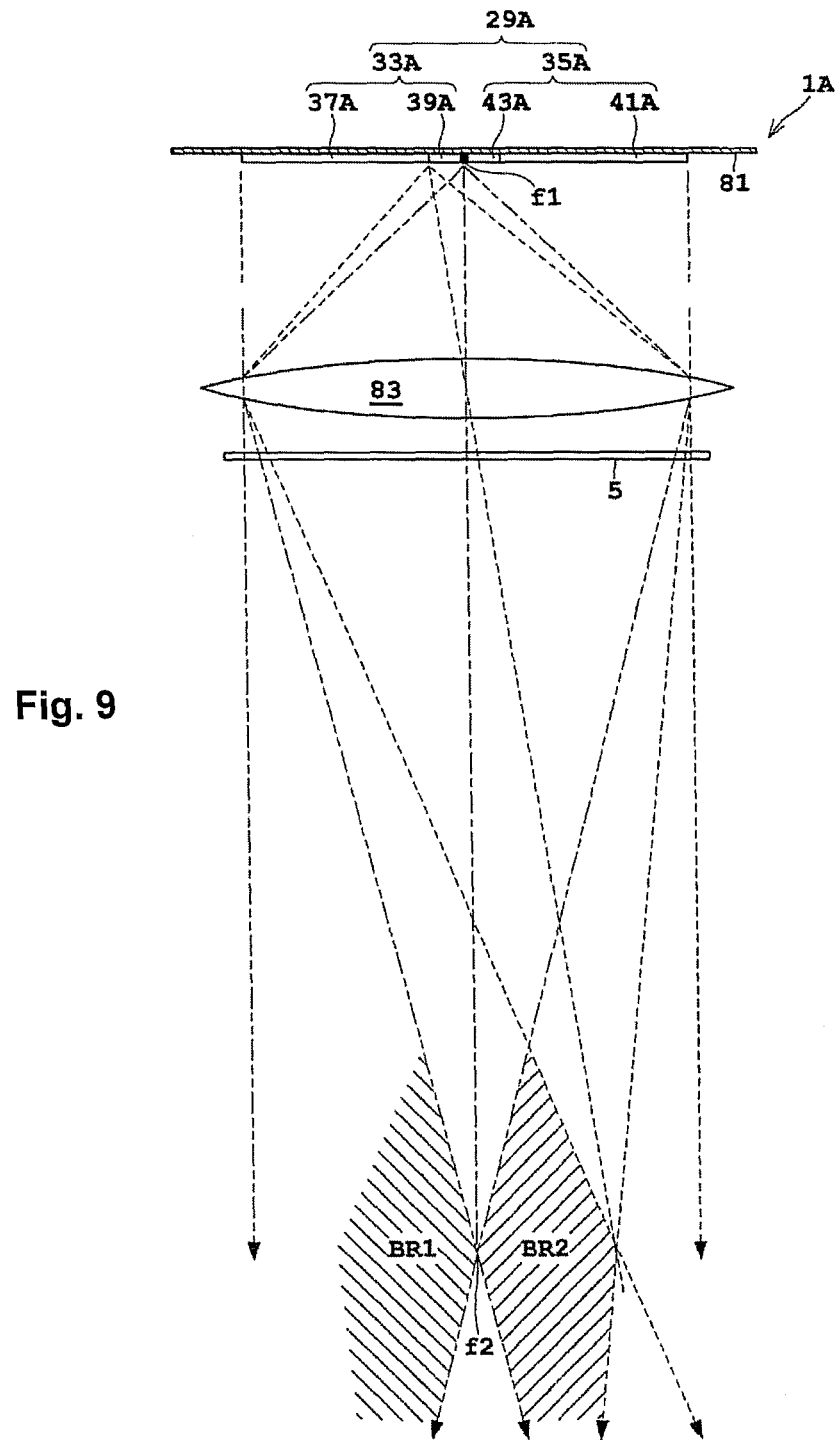
FIG. 9 is a transverse sectional view illustrating a schematic configuration of a stereoscopic image display device according to the second embodiment.

FIG. 9 is a transverse sectional view illustrating a schematic configuration of a stereoscopic image display device according to the second embodiment.

A stereoscopic image display device 1A of the present second embodiment is different from the first embodiment in that the stereoscopic image display device 1A does not have a reflection-related configuration (such as an elliptical mirror). Note that the configurations similar to those in the first embodiment will be indicated by the same numerals, and the description thereof will be omitted.

The stereoscopic image display device 1A has the transparent liquid crystal display panel 5, a backlight mount 81, and a cylindrical convex lens 83. The backlight mount 81 is provided separately from the transparent liquid crystal display panel 5, and has an upper light source unit 29A and a lower light source unit 31A on the-transparent-liquid-crystal-display-panel-5 side of the backlight mount 81. Note that the lower light source unit 31A is not shown for better illustration. The upper light source unit 29A will be exclusively described in the following description, and the lower light source unit 31A has the similar configuration. The cylindrical convex lens 83 has a length in a direction perpendicular to a direction of the paper, and has the first focal point f1 on a back side of the transparent liquid crystal display panel 5 and on a back side of the cylindrical convex lens 83. Also, a straight line connecting the first focal point f1 with the second focal point f2 is set to be positioned between both eyes of the viewer. The second focal point f2 may be located in any position on the straight line.

The upper light source unit 29A has a right-eye light source 33A and a left-eye light source 35A. The right-eye light source 33A has a right-eye outer light source 37A and a right-eye inner light source 39A, and the left-eye light source 35A has a left-eye outer light source 41A and a left-eye inner light source 43A. In the present embodiment, because of the optical system of the cylindrical convex lens 83, the right-eye outer light source 37A is longer than the right-eye inner light source 39A, and the left-eye outer light source 41A is longer than the left-eye inner light source 43A. However, the above light sources may have lengths equivalent to the half of the respective one of the right-eye light source 33A and the left-eye light source 35A depending on the optical system. Also, the left-eye inner light source 43A may be longer than the left-eye outer light source 41A. In other words, the above light sources may be designed depending on the desired positions and sizes of the light blocking regions BR1, BR2.

Note that the above cylindrical convex lens 83 corresponds to the "light-gathering means" of the present invention. Also, the above upper light source unit 29A and the lower light source unit 31A correspond to the "light source unit" of the present invention. Also, the right-eye light source 33A corresponds to the "first light source" of the present invention, and the left-eye light source 35A corresponds to the "second light source" of the present invention. Also, the right-eye outer light source 37A and the left-eye outer light source 41A correspond to the "outer light source" of the present invention, and the right-eye inner light source 39A and the left-eye inner light source 43A correspond to the "inner light source" of the present invention.

Similarly to the first embodiment, the light source control part 67 controls the right-eye light source 33A and the left-eye light source 35A configured as above to alternately and asymmetrically emit light in a time-division manner based on the image displayed on the transparent liquid crystal display panel 5. As a result, as shown in FIG. 9, since the light blocking region BR1 and the light blocking region BR2 are formed, it is possible to achieve the advantages similar to the first embodiment. Also, the configuration of the optical system is relatively simpler than that of the first embodiment.

Third Embodiment

Next, the third embodiment of the present invention will be described with reference to drawings.

Figure 10:
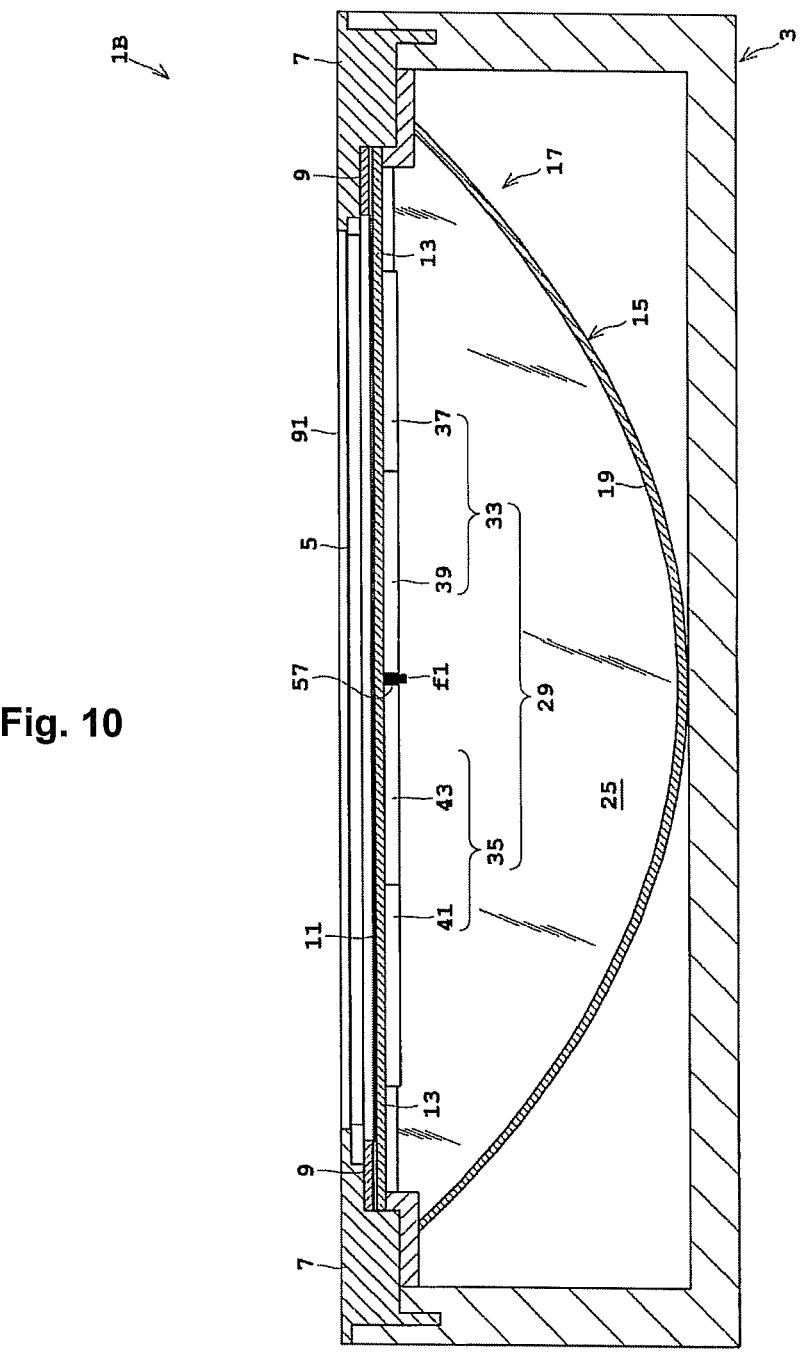
FIG. 10 is a transverse sectional view illustrating a schematic configuration of a stereoscopic image display device according to the third embodiment.

FIG. 10 is a transverse sectional view illustrating a schematic configuration of a stereoscopic image display device according to the third embodiment.

The present third embodiment further has an active polarizer 91 in addition to the configuration of the first embodiment. Specifically, the active polarizer 91 is attached to a front surface (light emitting surface) of the transparent liquid crystal display panel 5. Note that the configurations similar to those in the first embodiment will be indicated by the same numerals, and the description thereof will be omitted.

The active polarizer 91 has a function of converting a polarizing axis of light, which has passed therethrough, based on external signals. For example, when the function is turned on based on the external signals, the active polarizer 91 changes the polarization angle of the incident light to 90 degrees and outputs the light. When the function is turned off based on the external signals, the active polarizer 91 changes the polarization angle of the incident light to 0 degrees and outputs the light. As a result, the active polarizer 91 changes the polarization state of light, which travels from the transparent liquid crystal display panel 5 to the viewer, at desired timing.

Figure 11:
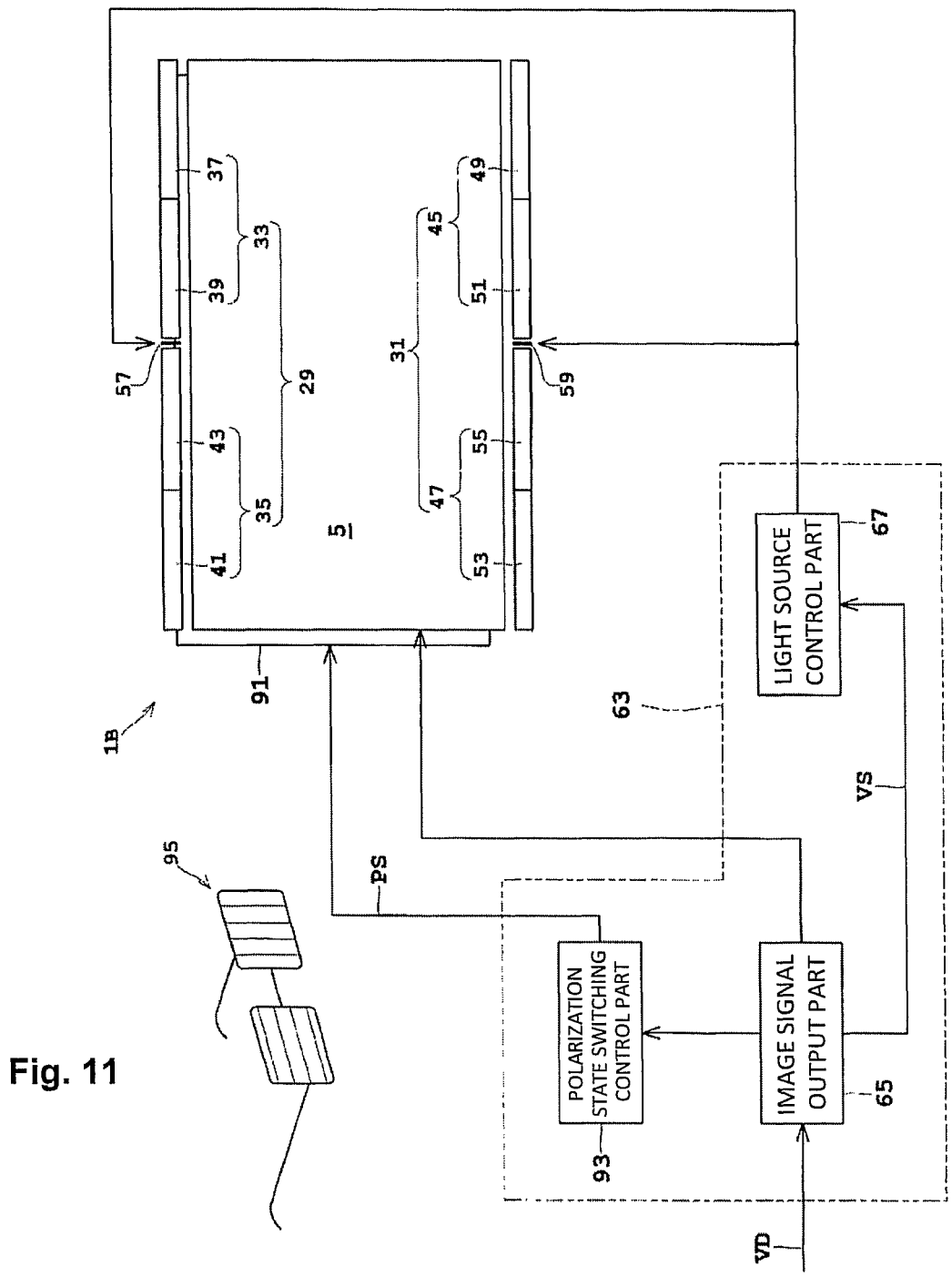
FIG. 11 is a block diagram of a control system.

FIG. 11 is now referred to. Note that FIG. 11 is a block diagram of a control system.

The active polarizer 91 changes the polarization state by a polarization state switching control part 93. The polarization state switching control part 93 outputs polarizing switching signals PS. The active polarizer 91 alternately switches, in a time-division manner, the polarization state between two different states, for example, for the right-eye image and for the left-eye image, based on the polarizing switching signals PS. A right-eye lens of a pair of viewing glasses 95 is in a polarization state that allows the right-eye image to pass therethrough and blocks the left-eye image, and a left-eye lens of the viewing glasses 95 is in another polarization state that allows the left-eye image to pass therethrough and blocks the right-eye image.

More specifically, for example, when the right-eye lens of the viewing glasses 95 is set in the polarization state of 90 degrees and the left-eye lens of the viewing glasses 95 is set in the polarization state of 0 degrees, the right-eye image is visible exclusively to the right eye only when the active polarizer 91 changes the polarization state of the right-eye image to 90 degrees. Also, the left-eye image is visible exclusively to the left eye only when the active polarizer 91 changes the polarization state of the left-eye image to 0 degrees.

Due to the above configuration, in the region other than the light blocking regions BR1, BR2, the viewer is capable of viewing the stereoscopic image similarly to the first embodiment. Also, the viewing glasses 95 are capable of reducing burden on the eye of the viewer compared with the viewing glasses 71 that alternately block vision in a time-division manner with the shutter.

The present invention is not limited to the above embodiment, and may be modified in the following manner.

Figure 12:
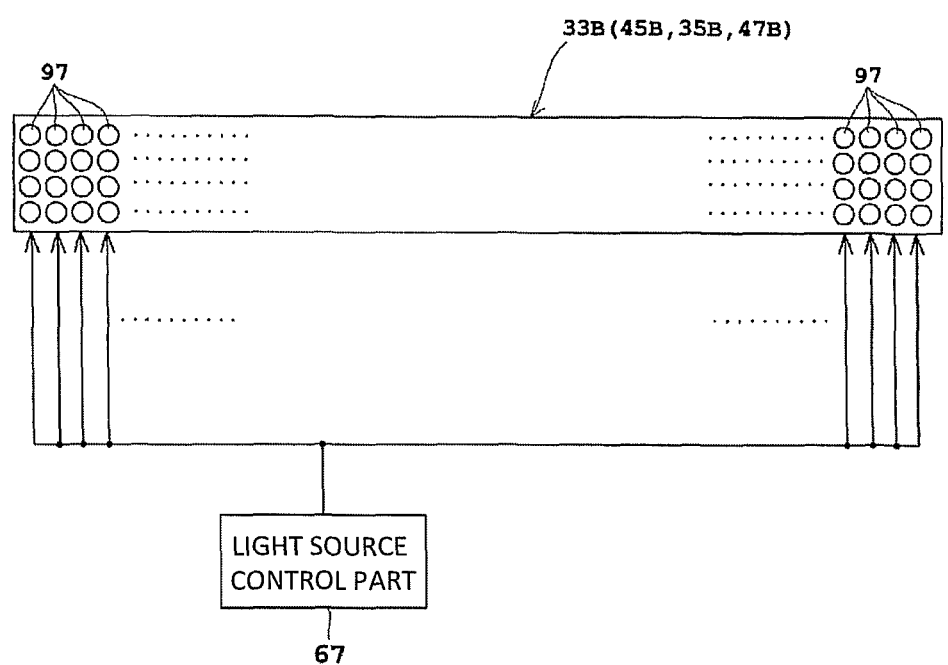
FIG. 12 is a schematic configuration diagram illustrating a modification of the light source.

(1) In each of the above embodiments, the right-eye light sources 33, 45 and the left-eye light sources 35, 47 are described to be separate members. However, the present invention is not limited to the above configuration, but may have the configuration shown in FIG. 12, for example. Note that FIG. 12 is a schematic configuration diagram illustrating modification of the light source.

Since the right-eye light sources 33B, 45B and the left-eye light sources 35B, 47B may all have the same configuration, the right-eye light source 33B will be described as an example. The right-eye light source 33B has multiple small-size light sources 97 (for example, light emitting diodes) embedded in a light emitting surface. The light source control part 67 determines which one of the small-size light sources 97 to light. According to the above configuration, the inner light source and the outer light source are selectively located at any positions, for example. As a result, it is possible to adjust, to some extent, the size and position of the light blocking regions BR1, BR2. In other words, it is possible to delicately adjust the position for viewing the stereoscopic image with naked eyes.

(2) In each of the above embodiments, the upper light source unit 29 and the lower light source unit 31 are provided as the light source unit. However, the upper light source unit 29 may be exclusively provided, instead. Due to the above, it is possible to suppress the electrical power consumption, and still to display the image. Also, the configuration exclusively having the lower light source unit 31 may achieve the similar advantages.

(3) In each of the above embodiments, the transparent liquid crystal display panel 5 is described as an example of the transparent display panel. However, the present invention is not limited to a liquid crystal display type, and the present invention is applicable to any transparent display panel. The example of the transparent display panel includes a transparent MEMS (microelectro mechanical systems).

(4) The third embodiment has the configuration, which includes the active polarizer 91 in addition to the configuration of the first embodiment. However, the third embodiment may have the configuration, which includes the active polarizer 91 in addition to the configuration of the second embodiment.

DESCRIPTION OF THE NUMERALS

1, 1A, 1B stereoscopic image display device
3 casing
5 transparent liquid crystal display panel
15 elliptical mirror
17 reflection unit
19 reflection surface
21 ellipse
F1 first focal point
F2 second focal point
ER right eye
EL left eye
27 light path space
29 upper light source unit
31 lower light source unit
33, 45 right-eye light source
35, 47 left-eye light source
37, 49 right-eye outer light source
39, 51 right-eye inner light source
41, 53 left-eye outer light source
43, 55 left-eye inner light source
63 control part
65 image signal output part
67 light source control part
69 shutter change control part
VD video signal VS vertical synchronization signal
71 viewing glasses
SS shutter control signal
BR1, BR2 light blocking region
83 cylindrical convex lens

The invention claimed is:
1. A stereoscopic display system including:
a stereoscopic image display device for displaying a stereoscopic image comprising:
a transparent display panel provided to alternately display a right-eye image and a left-eye image in a time-division manner;
a light-gathering means provided on a back side of the transparent display panel, the light-gathering means having a first focal point on the back side of the transparent display panel, the light-gathering means having a second focal point in such a way that a straight line connecting the first focal point and the second focal point is located between both eyes of a viewer;
a light source unit provided to face the light-gathering means, the light source unit having a first light source and a second light source, which are located to interpose the first focal point therebetween in a planar view, the first light source and the second light source alternately and asymmetrically emitting light in a lime-division manner, where a part of the first light source and the second light source adjacent the first focal point is turned off based on which of the right-eye image and the left-eye image is displayed,
each of the first light source and the second light source has, relative to a viewer side, an outer part located a distance from the first focal point and an inner part located adjacent the first focal point relative to the outer part, wherein said distance defines a width of the inner part, and the inner part of the first light source and the inner part of the second light source are interposed between the first focal point and the respective outer parts of the first light source and the second light source, the outer part and the inner part being independently controllable to emit light
a light source control part that controls the light source unit to cause an entire surface of the first light source and only the outer part of the second light source to emit light when the right-eye image is displayed on the transparent display panel, the light source control part controlling the light source unit to cause an entire surface of the second light source and only the outer part of the first light source to emit light when the left-eye image is displayed on the transparent display panel; and
the stereoscopic display system further comprising: viewing glasses that allow light to enter a right eye and block light from entering a left eye when the right-eye image is displayed on the transparent display panel, wherein the viewing glasses allow light to enter the left eye and block light from entering the right eye when the left-eye image is displayed on the transparent display panel, wherein:
a mixed region, a first region, and a second region are formed on the viewer side;
the right-eye image and the left-eye image of the transparent display panel both reach the mixed region;
the right-eye image of the transparent display panel reaches the first region exclusively; and
the left-eye image of the transparent display panel reaches the second region exclusively.

2. A stereoscopic display system including:
a stereoscopic image display device for displaying a stereoscopic image comprising:
a transparent display panel provided to alternately display a right-eye image and a left-eye image in a time-division manner;
a reflection unit provided on a back side of the transparent display panel, the reflection unit having an elliptical mirror that includes:
a reflection surface, which forms a part of an arc of an ellipse, and which has a shape symmetrical about a center line in a planar view;
a first focal point of the ellipse located on the back side of the transparent display panel and also on the reflection surface side; and
a second focal point of the ellipse located on a viewer side;
a light source unit that includes a first light source and a second light source, which are located on the first focal point side of the reflection unit, wherein:
the first light source and the second light source are located on the back side of the transparent display panel so as to be positioned to emit light toward the reflection surface;
the first light source and the second light source are provided between a part of the arc of the ellipse and the display panel so as to interpose the first focal point of the reflection unit between the light sources in the planar view; and
each of the first light source and the second light source has, relative to the viewer side, an outer part located a distance from the first focal point and an inner part located adjacent the first focal point relative to the outer part, wherein said distance defines a width of the inner part, and the inner part of the first light source and the inner part of the second light source are interposed between the first focal point and the respective outer parts of the first light source and the second light source, the outer part and the inner part being independently controllable to emit light;
a light source control part that controls the light source unit to cause an entire surface of the first light source and only the outer part of the second light source to emit light when the right-eye image is displayed on the transparent display panel, the light source control part controlling the light source unit to cause an entire surface of the second light source and only the outer part of the first light source to emit light when the left-eye image is displayed on the transparent display panel; and
the stereoscopic display system further including: viewing glasses that allow light to enter a right eye and block light from entering a left eye when the right-eye image is displayed on the transparent display panel, wherein the viewing glasses allow light to enter the left eye and block light from entering the right eye when the left-eye image is displayed on the transparent display panel.

3. The stereoscopic image display device according to claim 2, comprising:
a polarization state changing panel provided to the transparent display panel for making a polarization state of the right-eye image different from a polarization state of the left-eye image, wherein:
a right-eye lens of the viewing glasses is in a polarization state that allows the righteye image to pass therethrough and blocks the left-eye image; and a left-eye lens of the viewing glasses is in a polarization state that allows the left-eye image to pass therethrough and blocks the right-eye image.

4. The stereoscopic image display device according to claim 2, wherein each of the first light source and the second light source of the light source unit includes, in a separate manner:

an outer light source, which is located on an outer side thereof a distance from the first focal point; and an inner light source, which is located on an inner side thereof adjacent the first focal point relative to the outer light source.

5. The stereoscopic image display device according to claim 2, wherein:

each of the first light source and the second light source of the light source unit has a plurality of small-size light sources, and is an integrated light source comprised of an outer part located a distance from the first focal point and an inner part located adjacent the first focal point relative to the outer part, the outer part and the inner part being independently controllable.

\* \* \* \* \*